United States Patent [19]

Sato

[11] Patent Number: 5,558,290

[45] Date of Patent: Sep. 24, 1996

[54] BAITCASTING REEL HAVING A REMOVABLE SPOOL

[75] Inventor: Jun Sato, Sakai, Japan

[73] Assignee: Shimano Inc., Osaka, Japan

[21] Appl. No.: 305,564

[22] Filed: Sep. 14, 1994

Related U.S. Application Data

[62] Division of Ser. No. 8,706, Jan. 25, 1993, Pat. No. 5,386,948.

[30] Foreign Application Priority Data

Jan. 28, 1992 [JP] Japan ............................. 4-2489

[51] Int. Cl.⁶ ............................................. A01K 89/0155
[52] U.S. Cl. ............................ 242/313; 242/314; 242/322
[58] Field of Search ................................. 242/312–315, 242/322, 290, 306

[56] References Cited

U.S. PATENT DOCUMENTS

| | | | |
|---|---|---|---|
| 847,350 | 3/1907 | Marhoff | 242/314 |
| 2,537,590 | 1/1951 | Kaufman | 242/314 |
| 2,686,016 | 8/1954 | Kilian | 242/290 X |
| 3,612,436 | 10/1971 | Shakespeare et al. | 242/312 X |
| 3,614,015 | 10/1971 | Sussman | 242/312 |
| 4,606,512 | 8/1986 | Dennison | 242/314 X |
| 5,118,049 | 6/1992 | Roberts et al. | 242/312 X |
| 5,120,002 | 6/1992 | Kawai | 242/314 |
| 5,127,603 | 7/1992 | Morimoto | 242/313 X |
| 5,386,948 | 2/1995 | Sato | 242/313 |

FOREIGN PATENT DOCUMENTS 2-81172  6/1990  Japan.

*Primary Examiner*—Michael R. Mansen
*Attorney, Agent, or Firm*—Dickstein, Shapiro & Morin, LLP

[57] ABSTRACT

A baitcasting reel has a spool rotatably supported on a spool shaft between side bodies for taking up a fishing line. One of the side bodies includes an outer case pivotable to expose an opening through which the spool and spool shaft are removable. A restricting device, such as a spring, is provided for engaging a small diameter portion of the spool shaft to prevent movement thereof toward the opening. The spool and spool shaft are manually removable through the opening against a retaining force of the restricting device.

8 Claims, 7 Drawing Sheets

BAITCASTING REEL HAVING A REMOVABLE SPOOL

This application is a division of application Ser. No. 8/008,706, filed Jan. 25, 1993, now U.S. Pat. No. 5,386,948.

BACKGROUND OF THE INVENTION

1. Field of the Invention

This invention relates to a baitcasting reel, and more particularly to an improvement in a baitcasting reel having side bodies arranged at opposite ends of a spool, in which a part or whole of one of the side bodies may be opened to allow removal of the spool.

2. Description of the Related Art

A baitcasting reel as constructed above is disclosed in Japanese Utility Model Publication Kokai No. 2-81172, for example. This reel has a part of one of the side bodies rotatable to separate from the side body along with a bearing of a spool shaft. The spool may be removed through an opening formed after that part of the side body is separated.

The reel allowing the spool to be removed by opening a position laterally of the spool as noted above facilitates a measure taken to deal with a backlash of a fishing line. Further, the fishing line may be changed with ease by changing the spool.

However, since a bearing of the spool shaft is removed in the opening operation, the spool may fall off when the opening is inadvertently directed downward. Thus, there is room for improvement.

This type of baitcasting reel is often used in boat fishing. It is therefore possible for the spool to fall off and drop into the water. An appropriate improvement is desired to avoid such an inconvenience.

SUMMARY OF THE INVENTION

An object of the present invention is to provide an improved baitcasting reel which prevents the spool from falling off even when the opening is inadvertently directed downward, while retaining the advantage of allowing removal of the spool as in the prior art.

The above object is fulfilled, according to the present invention, by a baitcasting reel comprising a side body disposed laterally of a spool to be openable for allowing the spool to be pulled out through the opening, and a restricting device for engaging a spool shaft or the spool to prevent movement thereof toward the opening, the restricting device being disengageable by a manual operation.

The present invention has the following function and effect.

The above features may be arranged as shown in FIGS. 1 and 5, for example. When the spool 3 is mounted in place, a spring 46 (one example of restricting device S) disposed in a side body A' which is not openable engages a small diameter portion 19A of the spool shaft 19. When a case 9 is opened and the resulting opening is directed downward, the spool 3 is not movable toward the opening because of the engagement between the spring 46 and small diameter portion 19A. For removing the spool 3, the spool 3 may forcibly be pulled (one example of manual operation) out of the opening.

That is, according to the present invention, the restricting device S is disengageable only when the angler deliberately pulls out the spool 3. The spool 3 does not fall off even if the angler inadvertently handles the reel.

Thus, the baitcasting reel according to the present invention prevents the spool from falling off even when the opening is inadvertently directed downward, while retaining the advantage of allowing the spool to be removed through the opening formed laterally thereof.

Particularly where the restricting device comprises a spring for engaging the small diameter portion of the spool shaft, no special operation is required to cancel the disengagement. The spool may be pulled out simply by an operation to apply a slight force in a pull-out direction.

The foregoing and other objects, features and advantages of the invention will be apparent from the following more particular description of preferred embodiments of the invention, as illustrated in the accompanying drawings.

DETAILED DESCRIPTION OF THE PREFERRED EMBODIMENTS

A baitcasting reel according to the present invention will be described in detail with reference to the drawings.

Figure 1:
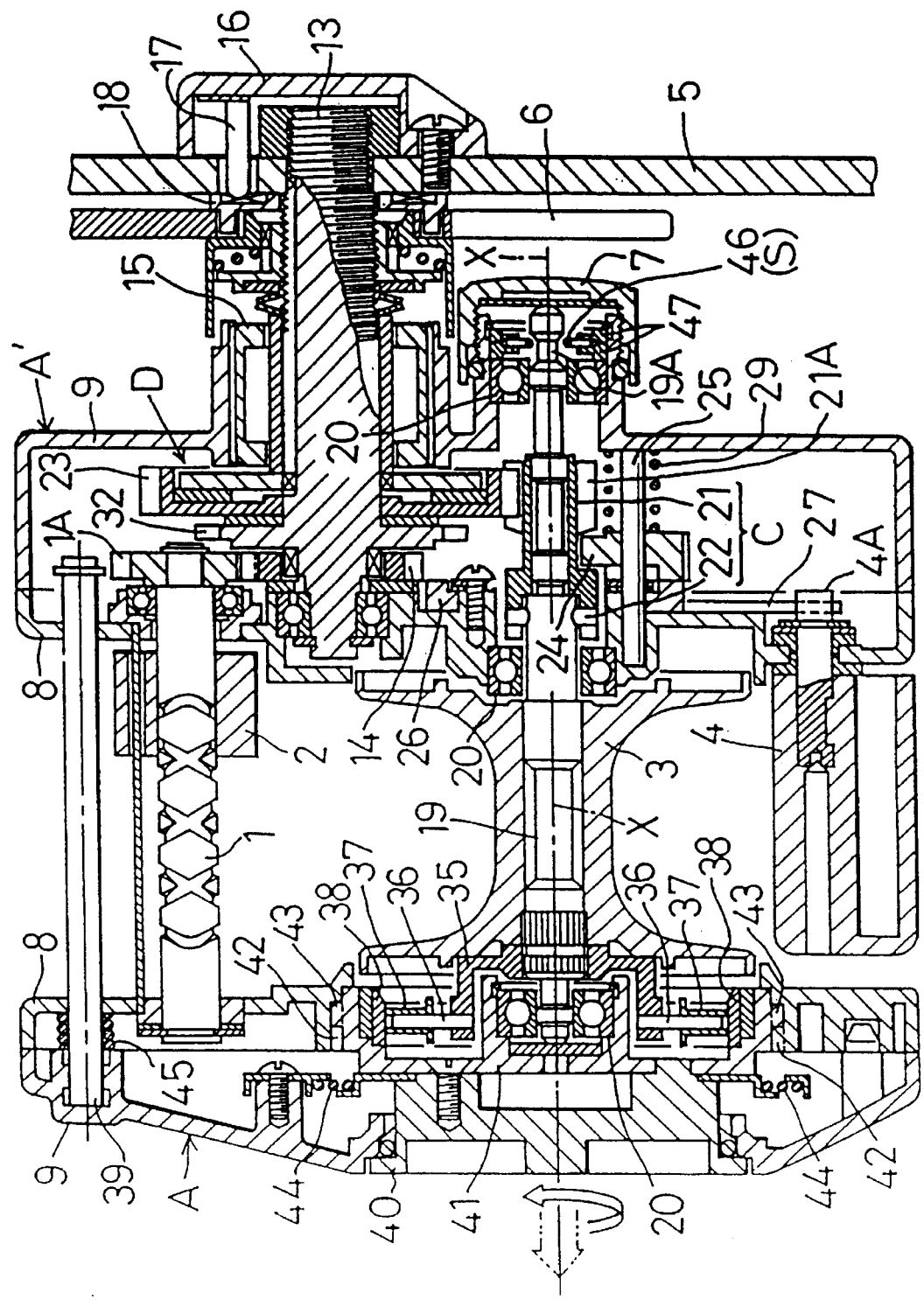
FIG. 1 is a plan view in cross section of a baitcasting reel according to the present invention.
Figure 2:
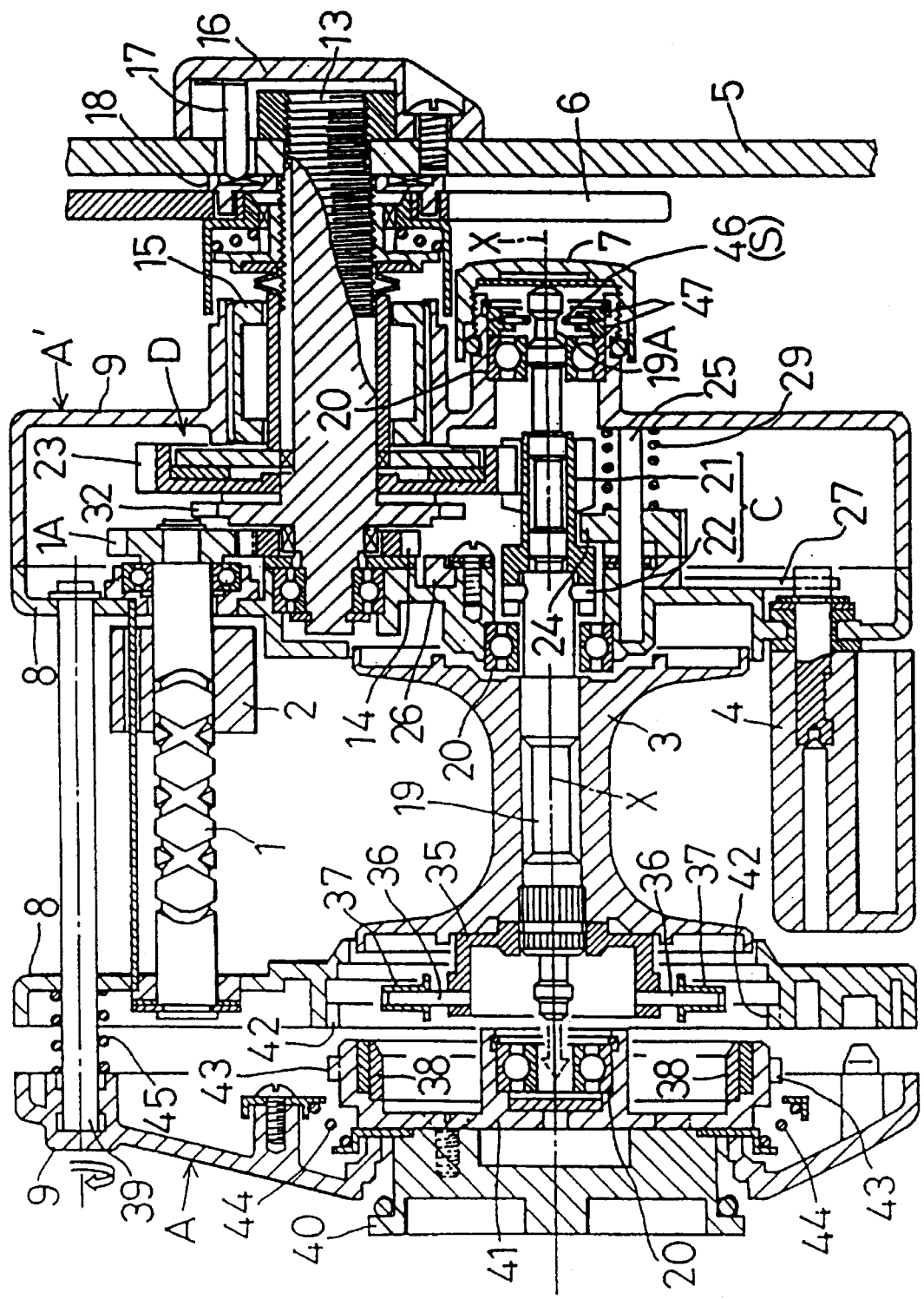
FIG. 2 is a plan view in cross section of the reel with a side body opened.
Figure 4:
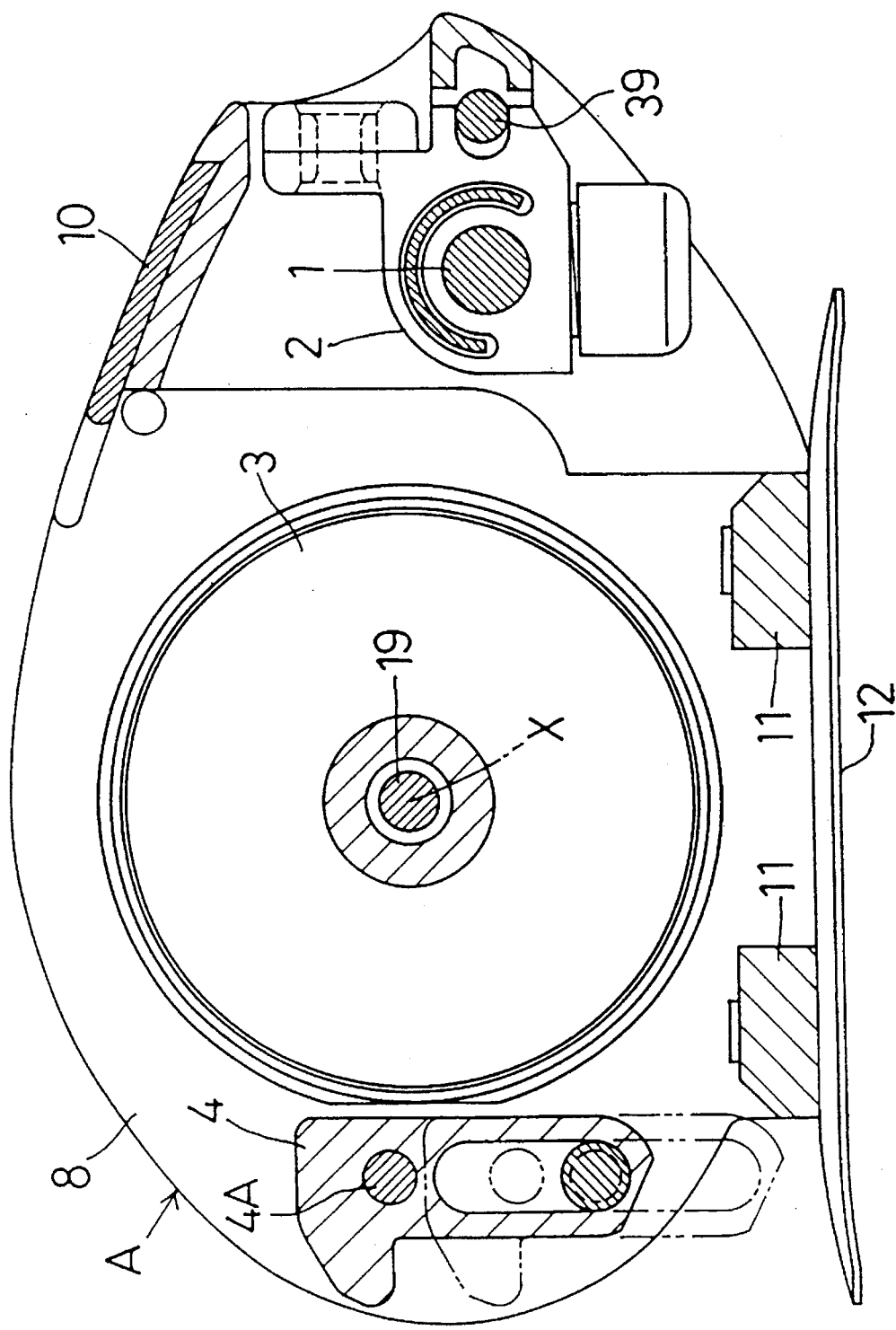
FIG. 4 is a side view in vertical section of the reel.

As shown in FIGS. 1, 2 and 4, the reel comprises right and left side bodies A' and A, respectively, supporting therebetween a level wind mechanism mounted in a forward position. The level wind mechanism includes a screw shaft 1, and a line guide 2 reciprocable right and left with rotation of the screw shaft 1. The side bodies A' and A further support a spool 3 mounted in a middle position, and a clutch controller 4 mounted rearwardly of the spool 3. The right side body A' supports a handle 5, a drag controller 6 and a east controller 7.

Each side body A' and A includes an inner frame 8, and a case 9 covering an outer side of the frame 8. The left and tight frames 8 are formed integral with a thumb rest 10 disposed in an upper position therebetween, and a pair of front and rear lower frames 11 disposed in a lower position. A foot 12 extends between the lower frames 11.

The handle 5 and drag controller 6 are attached to a handle shaft 13 supported by the right side body A'. The handle shaft 13 further supports a drag mechanism D and an output gear 14 mounted on an inward portion thereof. A roller type one-way clutch 15 is disposed between the handle shaft 13 and case 9 to prevent backward turning of the handle 5. Drive is transmitted from the handle 5 through the output gear 14 to an input gear 1A on the screw shaft 1.

The drag controller 6 has a disk 18 attached to a surface thereof opposed to the handle 5. The handle 5 has a retainer 16 including a leaf spring 17 for engaging the disk 18 to make a clicking sound. This sound allows the angler to grasp an amount of operation of the drag controller 6.

The spool 3 has a spool shaft 19 rotatable therewith and supported by a plurality of bearings 20. The spool shaft 19 has a clutch mechanism C mounted thereon, which includes a clutch sleeve 21 slidably mounted on the spool shaft 19, and a pin 22 secured to the spool shaft 19 for engaging the sleeve 21. The clutch sleeve 21 has an input gear 21A meshed with an output gear 23 of the drag mechanism D. Thus, drive torque is transmitted from the handle 5 to the spool 3 through the drag mechanism D and clutch mechanism C.

Figure 3:
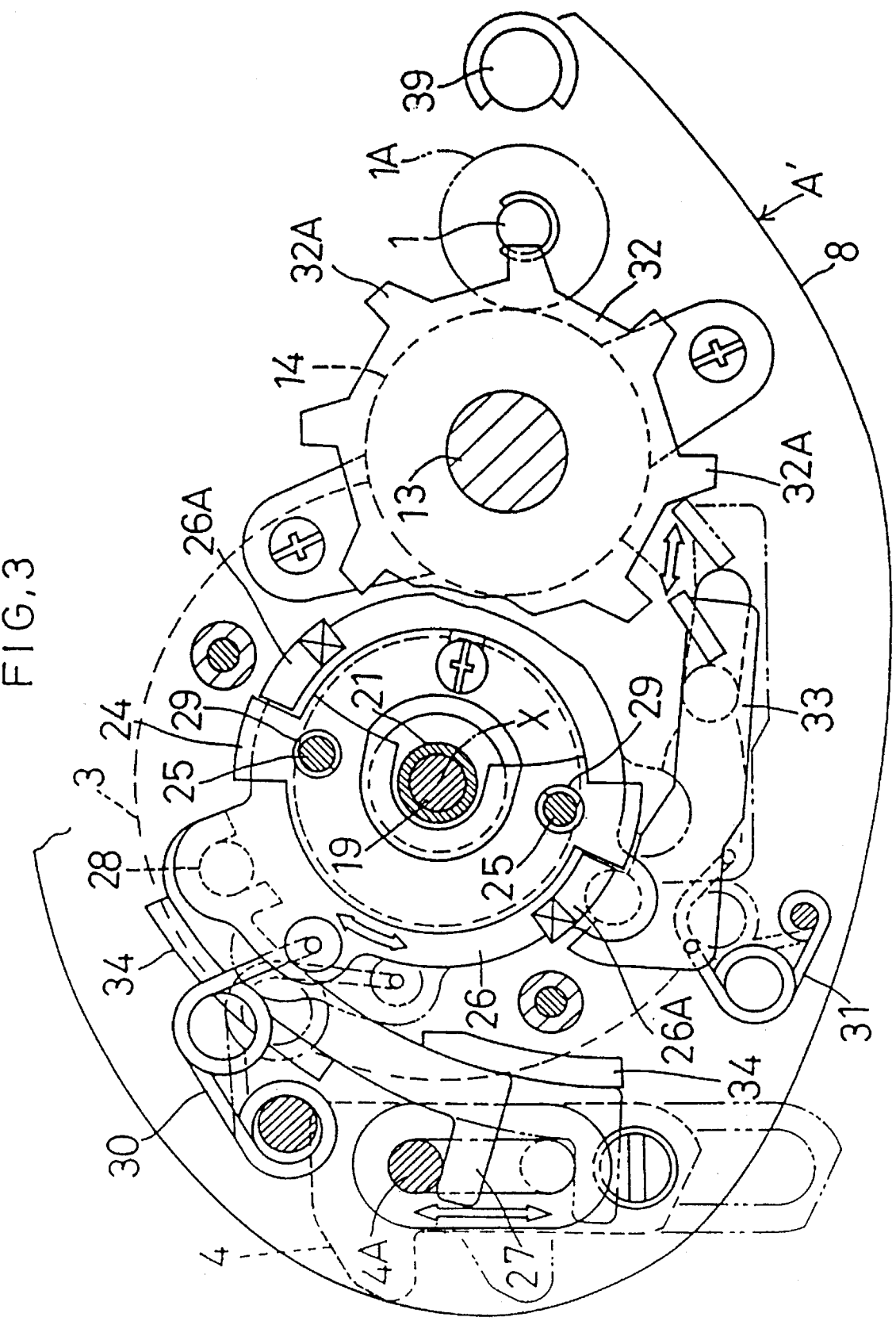
FIG. 3 is a side view of a clutch operating system.

As shown in FIG. 3, the clutch sleeve 21 is engaged with a shifter 24 slidably supported on a pair of support shafts 25. A rotary cam 26 rotatable about an axis X of the spool shaft 19 defines a pair of cam surfaces 26A for contacting the shifter 24. Thus, the rotary cam 26 operates the clutch sleeve 21 through the shifter 24. The rotary cam 26 has an engaging pin 28 engaged with a link element 27 operable through contact with a control pin 4A projecting from the clutch controller 4.

Compression springs 29 are mounted on the support shafts 25 to bias the shifter 24 to a position to engage the clutch mechanism C. A toggle spring 30 acts on the rotary cam 26 to set the rotary cam 26 to a position to engage the clutch mechanism C and to a position to disengage the clutch mechanism C. The rotary cam 26 includes a return arm 33 on which a further toggle spring 31 acts. When the clutch mechanism C is disengaged, the toggle spring 31 switches an end of the return arm 33 to a position to interfere with a return wheel 32.

When disengaging the clutch mechanism C, the clutch controller 4 is depressed. Then an operating force from the pin 4A of the clutch controller 4 causes the link element 27 to move describing an arcuate locus while in contact with a guide 34, to rotate the rotary cam 26. As a result, the clutch sleeve 21, through pressure contact with the cam surfaces 26A, moves in a declutching direction. When engaging the clutch mechanism C, the handle 5 is turned in a direction to take up a fishing line. This causes a tooth 32A of the wheel 32 to push the return arm 33, whereby the rotary cam 26 is rotated in a clutch engaging direction. Consequently, the shifter 24 moves under the biasing force of compression springs 29 to the position to engage the clutch mechanism C.

Figure 6:
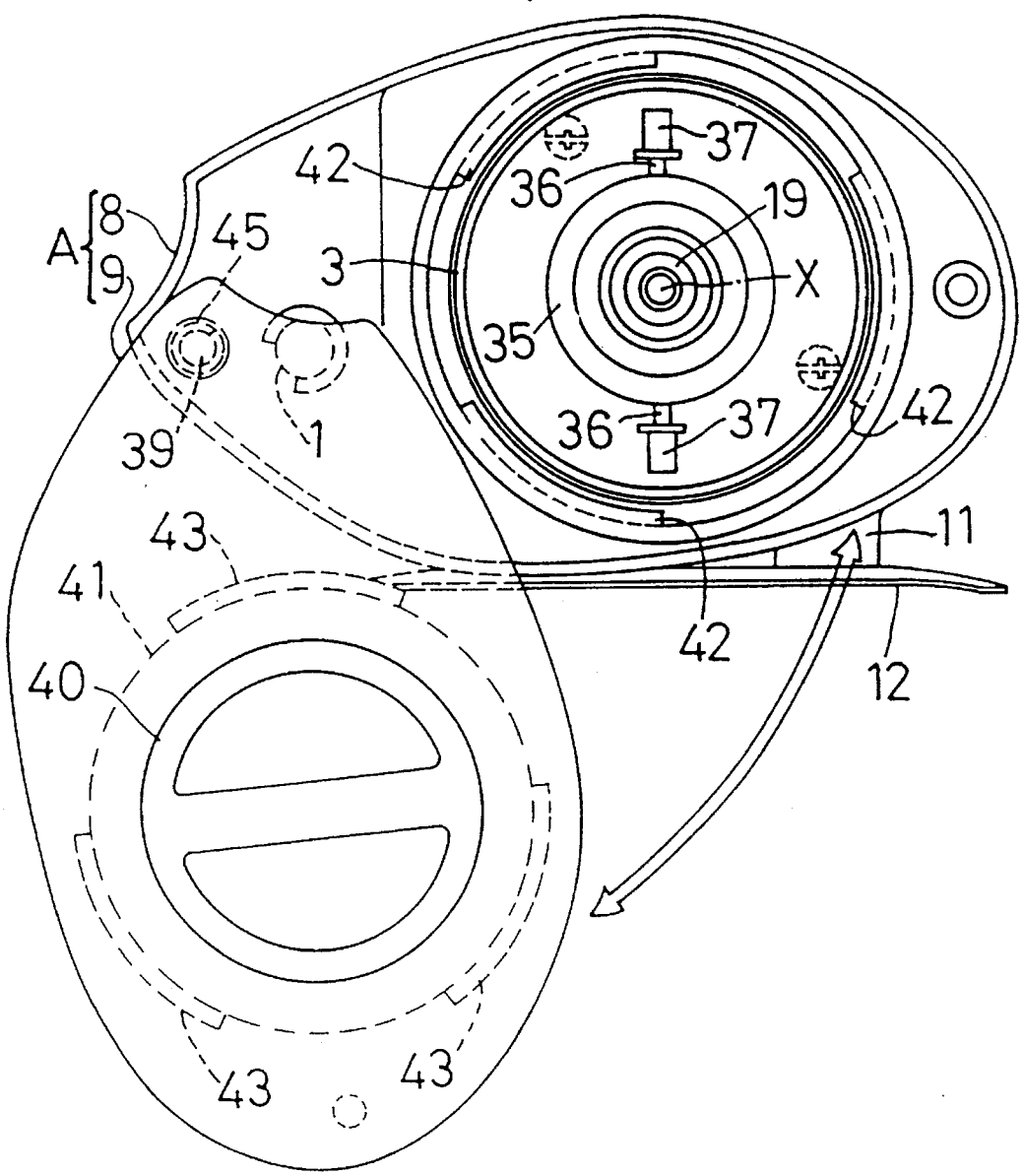
FIG. 6 is a side view of the reel with the side body opened.

As shown in FIGS. 1 and 6, the left side body A contains a centrifugal brake mechanism including a holder 35 fixed to the spool shaft 19. The holder 35 has rods 36 extending therefrom and slidably supporting collars 37, respectively. An annular friction member 38 is disposed outwardly of a locus of revolution of the collars 37.

The left case 9 is separable from the left frame 8. After its separation, the left case 9 is pivotable about a front axis 39 to provide a large opening laterally of the frame 9. Thus, the spool 3 may be removed from the reel, without allowing the case 9 to fall off.

Figure 7:
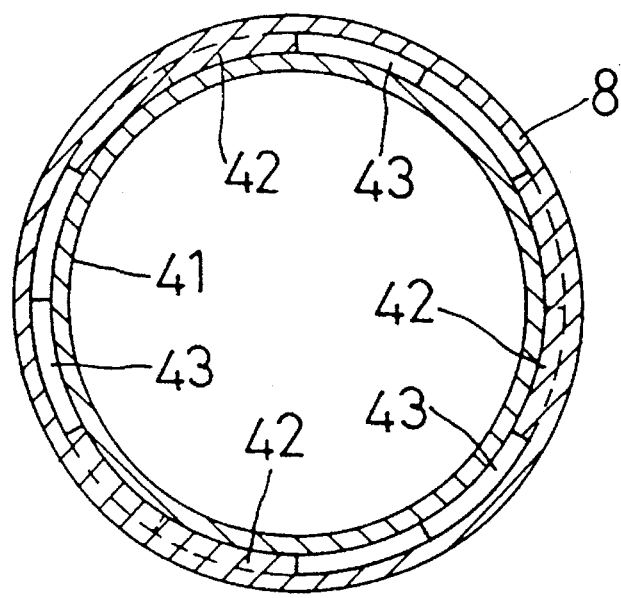
FIG. 7 is a sectional view showing engaging pieces and engaging lugs.

The left case 9 includes a knob 40 rotatable coaxially with the spool 3 and shiftable along the axis X of the spool shaft 19. The knob 40 is formed integral with a disk-like member 41 including one of the bearings 20 for supporting the spool shaft 19, and the friction member 38. As shown in FIGS. 6 and 7, the disk-like member 41 defines a plurality of lugs 43. With rotation of the disk-like member 41, the lugs 43 are movable into and out of engagement with a plurality of engaging pieces 42 formed along an inner periphery of a circular, spool-receiving opening of the frame 8. The knob 40 is turned to switch the case 9 between a position locked to the frame 8 through engagement between the engaging pieces 42 and lugs 43, and a position separated from the frame 8.

The engaging pieces 42 and lugs 43 are movable into and out of engagement with each other by rotation through a relatively small angle, e.g. 10 to 30 degrees. When an opening operation is carried out, the knob 40 and disk-like member 41 are pushed outward by the biasing force of a spring 44 as shown in FIG. 2. At the same time, the case 9 is pushed away from the frame 8 by the biasing force of a spring 45 mounted on the axis 39.

The spool 3 may be removed through the opening (the spool receiving opening formed in the frame 8) appearing when the case 9 is opened. A restricting device S is provided in order to prevent the spool 9 from falling off when the case 9 is opened, as noted hereinbefore. The restricting device S comprises a spring 46 engaged with a small diameter portion 19A of the spool shaft 19 disposed in the right side body A'.

Figure 5:
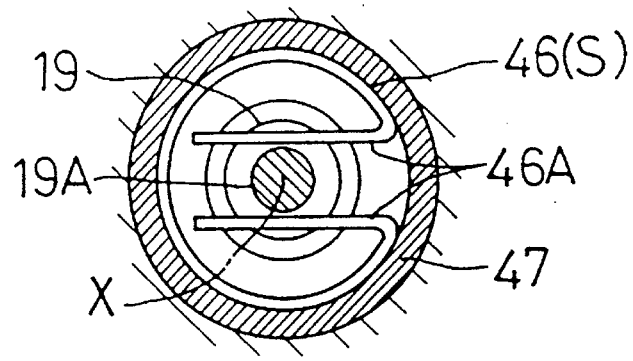
FIG. 5 is a sectional view showing a shape of a spring.

As shown in FIG. 5, the spring 46 includes a pair of engaging portions 46A nipping the small diameter portion 19A therebetween. The spring 46 is supported adjacent the east controller 7 through an annular holder 47. The spring 46 has a range of elasticity whose lower limit is set to a value not allowing the spring 46 to separate from the small diameter portion 19A under a total weight of the spool 3 and spool shaft 19. The range of elasticity has an upper limit set to a value for allowing the spring 46 to be elastically deformable, when the spool 3 is manually pushed or pulled, to move into and out of engagement with the small diameter portion 19A with ease.

In use, the case 9 may be opened in a one-touch operation of the knob 40. Even when the resulting opening is directed downward inadvertently, the spring 46 prevents the spool 3 from falling off. When the spool 3 is manually pulled out, the pair of engaging portions 46A of the spring 46 disengages from the small diameter portion 19A of the spool shaft 19 to allow removal of the spool 3.

Figure 8:
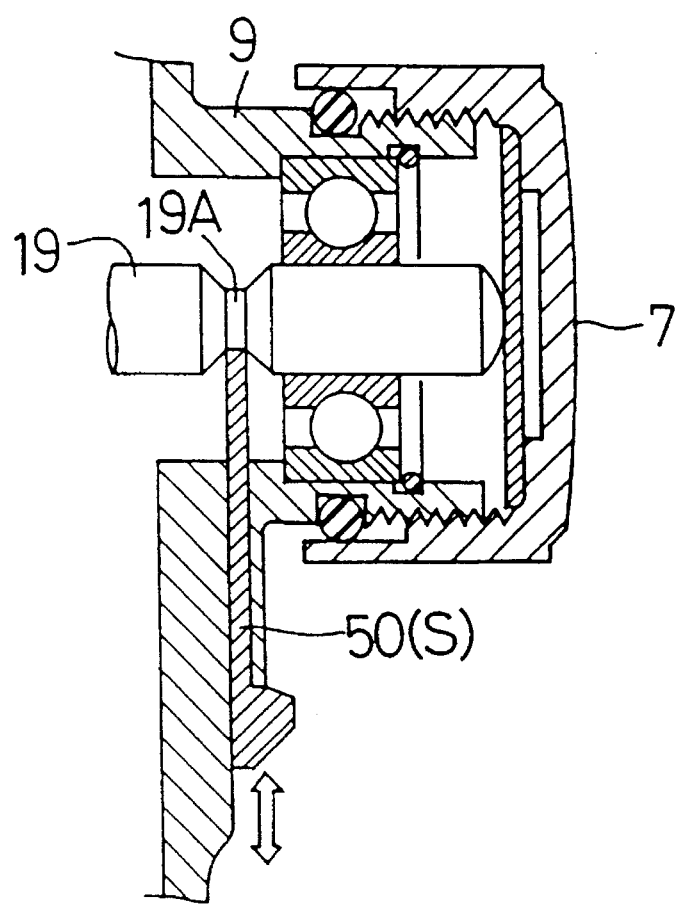
FIG. 8 is a sectional view of another embodiment.

The foregoing embodiment may be modified as follows:

(a) As shown in FIG. 8, the restricting device S may comprise a blade 50 slidable between a position to engage the small diameter portion 19A of the spool shaft 19 and a position retracted therefrom.

While in this construction the engagement and disengagement are effected by sliding movement, a manual rotating or swinging operation is also applicable.

Figure 9:
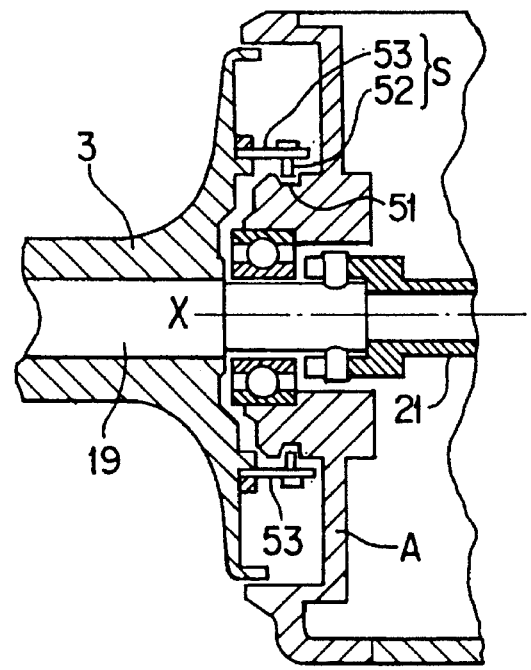
FIG. 9 is a sectional view of a further embodiment.

(b) As shown in FIG. 9, the side body A has a tubular portion disposed adjacent a flange of the spool 3. The tubular portion has an annular groove 51 formed peripherally thereof to be coaxial with the axis X of the spool shaft 19. The restricting device S includes pins 52 extending into the annular groove 51 when the spool 3 is mounted in place, and elastically deformable support members 53 such as leaf springs for connecting the pins 52 to the flange of the spool 3.

According to this construction, the spool 3 is prevented from fall off by gravity, while being manually removable through elastic deformation of the support members 53.

Figure 10:
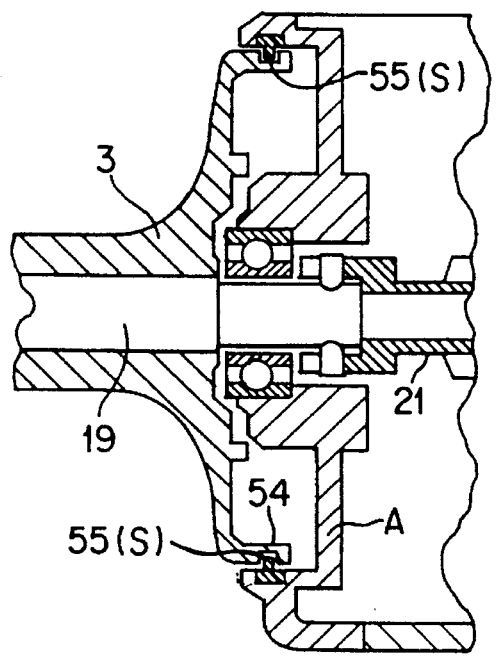
FIG. 10 is a sectional view of a still further embodiment.

(c) As shown in FIG. 10, an annular groove 54 is formed peripherally of the flange of the spool 3. The restricting device S comprises a projection 55 formed of rubber or other elastically deformable material and extending into the annular groove 54 when the spool 3 is mounted in place.

According to this construction, the spool 3 is prevented from fall off by gravity, while being manually removable through elastic deformation of the projection 55.

(d) This invention is applicable to a reel in which the side body supporting the handle may be opened. One of the side bodies may have a lid-like openable member as in the prior art. An entire case may be opened. Further, the opening operation may be carded out by manipulating a plurality of bolts.

What is claimed is:

1. A baitcasting reel comprising:

a frame;

first and second side bodies disposed on right and left sides, respectively, of said frame;

a spool rotatably supported within said frame and between said first and second side bodies for taking up a fishing line, said spool including a flange;

a spool shaft for rotatably supporting said spool to said first and second side bodies;

a handle supported by one of said first and second side bodies for rotating said spool in a direction to take up said fishing line;

an opening formed in at least one side face of said frame for allowing insertion and withdrawal of said spool from said frame, said opening being exposed by displacing an entire one of said first and second side bodies; and engaging means including, a tubular portion projecting from one of said side bodies, said tubular portion having an annular groove formed peripherally therein;

a pin, wherein said pin engages with said annular groove; and a support member for connecting said pin to said flange of said spool;

wherein said engaging means prevents said spool from being inadvertently withdrawn from said frame through said opening, and by a manual operation, said engaging means allows said spool to be withdrawn from said frame through said opening through elastic deformation of said support member.

2. A baitcasting reel as defined in claim 1, wherein said support member comprises a leaf spring.

3. A baitcasting reel as defined in claim 1, wherein said opening is formed in one of said first and second side bodies not supporting said handle.

4. A baitcasting reel as defined in claim 1, wherein said opening is exposed by pivoting said first side body about an axis extending parallel to said spool shaft.

5. A baitcasting reel comprising:

a frame;

first and second side bodies disposed on right and left sides, respectively, of said frame;

a spool rotatably supported within said frame and between said first and second side bodies for taking up a fishing line, said spool including a flange;

a spool shaft for rotatably supporting said spool to said first and second side bodies;

a handle supported by one of said first and second side bodies for rotating said spool in a direction to take up said fishing line;

an opening formed in at least one side face of said frame for allowing insertion and withdrawal of said spool from said frame, said opening being exposed by displacing a part of one of said first and second side bodies; and engaging means including, a tubular portion projecting from one of said side bodies, said tubular portion having an annular groove formed peripherally therein;

a pin, wherein said pin engages with said annular groove; and a support member for connecting said pin to said flange of said spool;

wherein said engaging means prevents said spool from being inadvertently withdrawn from said frame through said opening, and by a manual operation, said engaging means allows said spool to be withdrawn from said frame through said opening through elastic deformation of said support member.

6. A baitcasting reel as defined in claim 5, wherein said support member comprises a leaf spring.

7. A baitcasting reel as defined in claim 5, wherein said opening is formed in one of said first and second side bodies not supporting said handle.

8. A baitcasting reel as defined in claim 5, wherein said opening is exposed by pivoting said first side body about an axis extending parallel to said spool shaft.

* * * * *